United States Patent
Chauhan et al.

(10) Patent No.: US 11,206,575 B2
(45) Date of Patent: Dec. 21, 2021

(54) SYSTEM AND METHOD FOR WI-FI OFFLOAD

(71) Applicant: JIO PLATFORMS LIMITED, Ahmedabad (IN)

(72) Inventors: Devesh Chauhan, Mumbai (IN); Vinita Kaushik, Mumbai (IN); Hiren Patel, Mumbai (IN); Abhilash Shrivastava, Thane (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 16/939,680

(22) Filed: Jul. 27, 2020

(65) Prior Publication Data

US 2021/0029584 A1 Jan. 28, 2021

(30) Foreign Application Priority Data

Jul. 26, 2019 (IN) .............................. 201921030273

(51) Int. Cl.
*H04W 28/08* (2009.01)
*H04W 76/11* (2018.01)
*H04W 48/20* (2009.01)
*H04W 84/12* (2009.01)

(52) U.S. Cl.
CPC ....... *H04W 28/0812* (2020.05); *H04W 48/20* (2013.01); *H04W 76/11* (2018.02); *H04W 84/12* (2013.01)

(58) Field of Classification Search
CPC .......................... H04W 28/08; H04L 63/0853
USPC .......................... 370/230, 334, 329; 380/247
See application file for complete search history.

(56) References Cited

U.S. PATENT DOCUMENTS

| | | | | |
|---|---|---|---|---|
| 2016/0345203 | A1* | 11/2016 | Lim ........................ | H04W 4/08 |
| 2018/0091581 | A1* | 3/2018 | Yu ........................ | H04W 84/005 |
| 2019/0313246 | A1* | 10/2019 | Nix ........................ | H04L 9/3263 |

* cited by examiner

*Primary Examiner* — Kiet M Doan
(74) *Attorney, Agent, or Firm* — Klarquist Sparkman, LLP

(57) ABSTRACT

A system and method to identify different access names for discovering and learning service provider's Wi-Fi access networks in user's premises where user may have defined a customized SSID on said Wi-Fi Access Points, for increasing the likelihood for automatic Wi-Fi offload on service provider network thus enhancing user experience to dynamically offload a user equipment [202] and prevent revenue loss for the service provider by keeping the user always on its Network (either cellular or Wi-Fi). Furthermore, the method encompasses identifying of a parent service provider's user-defined Wi-Fi Access Network SSID(s), learning one or more information of connection between said SSID(s) and the UE [202], categorizing said SSID(s) and allowing automated offload to a selected SSID whenever the UE [202] is within its coverage.

11 Claims, 7 Drawing Sheets

SYSTEM AND METHOD FOR WI-FI OFFLOAD

TECHNICAL FIELD

The technical field generally relates to the field of wireless network and more particularly to a system and method for Wi-Fi offload.

BACKGROUND OF THE DISCLOSURE

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In a traditional cellular deployment, suitable powered macrocells are being deployed to cover sufficiently large areas. However, this macrocells only deployment, generally suffers from quick capacity degradation as the number of user equipment (UE) operating in the macrocells coverage areas increase. Therefore, operators are now reinforcing their macrocells deployment with one or multiple low powered small cellular cells (generally termed as Femto/Pico/Micro cells) placed at multiple strategic locations within one or more macro coverage areas. This kind of reinforced cellular network is generally termed as Heterogeneous network, in short, HetNet.

For a typical HetNet, strategic locations for small cells generally include areas with a high density of users, such as shopping malls, airports, railway/bus stations, colleges, etc. Also, these locations might include an area with dead-spots, or areas with low macro signal strength, such as indoor establishments or peripheral locations of a macro coverage area.

Reinforced with small cells placed at multiple strategic locations as described above, Heterogeneous Networks not only provide the increased mobile data capacity but also provide better mobile coverage, thereby enhancing the overall user's mobile broadband experience.

In recent years, Wi-Fi technology based on IEEE 802.11 standards has also seen tremendous growth and commercialization. Almost all available UE (user equipment) with cellular capability support have now Wi-Fi capability by default in order to connect to Wi-Fi networks operating in either of the unlicensed frequency bands, 2.4 GHz, or 5 GHz. The fact, therefore, is also motivating cellular operators to use ubiquitous and cost-effective Wi-Fi technology in pursuing their HetNet strategy. Many operators are now deploying low powered Wi-Fi cells along with cellular small cells at multiple strategic locations identified for a HetNet. Further, for ease of maintenance and provision, few operators are also using Wi-Fi integrated versions of small cellular cells, wherein a Wi-Fi and cellular small cell technology are made available on common equipment.

Furthermore, an exemplary case of a typical heterogeneous network (HetNet) is shown in FIG. 1. FIG. 1 indicates a heterogeneous network comprising macro base station (macro eNodeB) (1), providing a wide area coverage in a macro cell (2) to various serves users. Further, within the macro cell (2), several low power nodes are employed in service areas having a higher density of users requiring high data rates are denoted. Examples of such low power nodes comprise micro cells/base station (3). Also, micro cell integrated with Wi-Fi radio (4) is also used widely to provide multi-technology hotspot capacity/coverage goals. The operators may also deploy independent & cost-effective Wi-Fi Access points (5) in hotspot areas to offload cellular load, and to meet capacity/coverage requirements of users.

Further, in the heterogeneous network, as depicted in the FIG. 1, the macro base station (1) coverage could be used for wide-area overlay mobility coverage, while the micro base stations along with Wi-Fi Access points (3, 4, and 5) coverage could be used for a mobile capacity upgrade.

Also, an Access Network Detection and Selection Function (ANDSF) is defined by 3GPP for autonomous LTE/Cellular Network to WLAN (and vice versa) data/voice offload. The client-server architecture of the ANDSF is aimed to realize seamless Wi-Fi offload for improving customer experience through connection with a good quality Wi-Fi and at the same time as an effective tool for decongestion of operator LTE/Cellular network. Further, the ANDSF provides functionality to operators to define centralized policies for offloading to operator-preferred network connections. The ANDSF server assists the user equipment (UE) to discover operator Wi-Fi networks through an ANDSF client residing on it. The ANDSF client automatically enables a mobile user's data and voice to be offloaded from LTE/Cellular Network to Wi-Fi and vice-versa based on these defined policies.

Further, a typical policy defined at the server has a list of access technology type for e.g. Wi-Fi, preferred Wi-Fi radio access identifier—the Service Set Identifier (SSID) which is simply the name of the Wi-Fi network and list of mobile operator network cell IDs as a possible source of Wi-Fi offload destination. The ANDSF client makes use of a background Wi-Fi scans from an Operating System (OS) of the user device and takes a decision to automatically offload on policy preferred SSID if in an acceptable range. Also, as an alternative, the ANDSF client can periodically check if the user is in the expected network Cell ID coverage, turns ON Wi-Fi on the device and attempts to connect to preferred SSID if in an acceptable range.

Furthermore, presently some known ANDSF solutions are available, but these known solutions have various limitations that make them unfit in certain deployment scenarios as explained below.

An existing art provides a solution relating to enhancement of an access network discovery and selection function (ANDSF) with a cell-type management object ("MO") based on policy. The policy can include network selection criteria based upon a cell-type. The cell-type may be a small cell cell-type, a macro cell cell-type, or a multi-standard metro cell ("MSMC) cell-type. The 3GPP based ANDSF solution comprises of an ANDSF server, which provides ANDSF MO policy to the device for enabling the ANDSF client to take RAT offload decisions based on different criteria defined in the MO.

Further, another existing art describes a connection with an access point, detecting location of the access point, detecting accuracy of the detected location of the access point, and in response to detecting the detected location of the access point to be more accurate than an earlier stored location of the access point, updating the detected location to a location database of the apparatus.

Yet, another existing art describes an automatic learning of Wi-Fi neighbors and network characteristics by monitoring network neighborhood for a non-cellular access point. Further, said prior art uses information passed on by the UE to different network nodes like ANDSF Server, Wi-Fi Controller, or RAN to dynamically create policies such as location-based policies, or a network neighborhood map of to identify AP proximity or associating Wi-Fi AP with RAN cell for optimizing mobility.

Further, all the above stated prior known solutions fail to provide a solution to the problem of dynamically identifying different access names for discovering and learning service provider's non-Enterprise Wi-Fi network where a customer/user may have defined custom SSIDs which may be different from operator defined SSIDs. Furthermore, there is no solution that can dynamically discover and select a service provider's non-Enterprise Wi-Fi access points at a customer's premises.

Further, the prior known solutions also have some major limitations for a service provider. The service provider(s) can have diverse Wi-Fi business models to capitalize on the unlicensed Wi-Fi spectrum. These include public enterprise Wi-Fi spaces, Home Wi-Fi, school and hotel Wi-Fi, portable routers and end-user hotspots. Further, there can be two types of primary service provider Wi-Fi networks to cater to the above requirements i.e. (i) Enterprise Wi-Fi: This is typically deployed in all public places to serve public Wi-Fi to customers. It radiates a common SSID from all the Access Points and uses an EAP-AKA based automated authentication mechanism using service provider credentials from a service identity module (SIM) in the user device. Any customer/user of the service provider can attach to its service provider's Enterprise Wi-Fi. (ii) Non-Enterprise Wi-Fi: This is typically deployed in customer premises where the connectivity and the Wi-Fi Access Point is provided by the service provider, but the usage of the Wi-Fi Access Point is managed by the customer for e.g. Wi-Fi at Homes or Small Offices. Customer can define a custom SSID on this Access Point and connect to it using WPA2 based local authentication with the Access Point (AP). Further, in automated Wi-Fi offload solutions, the Wi-Fi Offload is done on the common pre-defined SSID(s) for Enterprise Wi-Fi APs. Further, the common SSID is pushed into the client in the user device through the ANDSF server and the client connects to this Enterprise Wi-Fi SSID automatically whenever it is in its coverage. This works well for Enterprise Wi-Fi access networks. For non-Enterprise Wi-Fi access network, however, the customer has the flexibility to customize the SSID name of Access Points (AP) deployed at homes/offices and may not always prefer to stay with the default SSID of the AP provided by the service provider. In such scenarios, even though the user is in service provider Wi-Fi network, the ANDSF client will not automatically offload to Wi-Fi since the user-defined customized SSID is not defined in the ANDSF server. Also, in other cases where the user cannot customize the SSID, the access point names can be different depending on different business models. This creates a dependency for the network operator to update the ANDSF policy with preferred access point names regularly. Further, in other cases, on WPA2 based personal Wi-Fi Access Points (APs) in customer premises, customer may have defined customized SSID and bookmarked it as favourite SSID in the user device, in such case, the ANDSF client does not know if the SSID belongs to the parent service provider's network and therefore the ANDSF client fails to decide to offload the cellular data/voice on said Wi-Fi SSID. Also, the current standards-based ANDSF solutions discover the service provider's Enterprise Wi-Fi access networks in its vicinity and select the preferred network based on pre-defined SSIDs known as managed SSIDs. Hence these solutions are not dynamic and rely on policy-based SSID names.

Therefore, in view of these and other existing limitations, there is an imperative need to provide a solution to overcome the limitations of prior existing solutions and to provide methods and systems for identifying a Wi-Fi Access Point (i.e. at least one of an Enterprise Wi-Fi access point and a non-Enterprise Wi-Fi access point) for offloading a cellular data from a cellular network or aggregating Cellular and WLAN traffic to/from the UE using technologies such as License Assisted Access (LAA), LTE-WLAN aggregation (LWA), LTE WLAN integration with IPSec tunnel (LWIP) and other such technologies.

SUMMARY OF THE DISCLOSURE

This section is provided to introduce certain objects and aspects of the present invention in a simplified form that are further described below in the detailed description. This summary is not intended to identify the key features or the scope of the claimed subject matter.

In order to overcome at least some of the drawbacks mentioned in the previous section and those otherwise known to persons skilled in the art, an object of the present disclosure is to provide a method and system for identifying a Wi-Fi Access Point for offloading a cellular data/voice from a cellular network. Also, an object of the present disclosure is to identify different access names, for discovering and learning Wi-Fi access networks in customer's premises where customer may have defined a customized SSID on the Wi-Fi AP provided by the service provider, for increasing the likelihood for automatic Wi-Fi offload on service provider network for enhancing customer experience and preventing revenue loss for the service provider by keeping the customer on its Network (either Cellular or Enterprise Wi-Fi or non-Enterprise Wi-Fi). Another object of the present disclosure is to provide a novel mechanism to improve the probability of Wi-Fi offload to service provider Wi-Fi Access network in customer's premises for providing data/voice offload. Another object of the present disclosure is to increase the Wi-Fi offload during peak consumption hours by leveraging the use of the Access Points (integrated with FTTx ONTs or Home Gateways) for offloading LTE/cellular network traffic to Wi-Fi at home. Also, an object of the present disclosure is to use service operator non-Enterprise SSIDs on standalone Wi-Fi Access points to offload LTE/cellular network traffic during day time and night hours, when most of the users are at home. Another object of the present disclosure is to provide a solution that can discover dynamically service provider Wi-Fi access network in its vicinity and selects the preferred network based on dynamic policies. Also, another object of the present disclosure is to provide a solution that uses a learning-based method, where a 'Wi-Fi connection manager client' on the customer's device automatically connects to those SSIDs which he manually connects often, provided they are within the service provider network and not to those outside the service provider network. Another object of the present disclosure is to provide solution that maximizes the Wi-Fi offload opportunity in the service provider network by evaluating Wi-Fi offload criteria based on both managed SSIDs defined in the policy as well as the SSIDs identified by learning method. Also, another object of the present disclosure is to provide an efficient and effective novel mechanism of offloading in heterogeneous networks. One another object of the present disclosure is to provide the users/customers with an enhanced experience in customer premises where a Wi-Fi access network is presently situated within a Het-Net coverage area. Another object of the present disclosure is to provide coverage in an area with dead-spots, or areas with low macro signal strength, such as indoor establishments or peripheral locations within a Het-Net coverage area. Also, another object of the present disclosure is to provide users with the features and ability to receive seamless services simultaneously or sequentially consequently without any latency and call drops. Another object of the present disclosure is to provide features and ability to handle high volume calls and sessions concurrently. Yet another object of the present disclosure is to provide a method that can be used across device vendors in a Heterogeneous Network.

In order to achieve the aforementioned objectives, the present invention provides a method and system for identifying a Wi-Fi Access Point for cellular data/voice offload or cellular and WLAN traffic aggregation. A first aspect of the present invention relates to a method for identifying a Wi-Fi Access Point for cellular data offload or Cellular and WLAN traffic aggregation. The method comprises initiating, via a processing unit at a user equipment (UE), a Wi-Fi Connection Manager Client, to offload the cellular data/voice from the cellular network to the Wi-Fi Access Point or Cellular and WLAN traffic aggregation. The method further method comprises identifying, via the Wi-Fi Connection Manager Client, at least one Wi-Fi Access Point, wherein each of the at least one Wi-Fi Access Point is associated with a user-defined Wi-Fi SSID. Further, the method comprises establishing, via the Wi-Fi Connection Manager Client, a temporary connection between the UE and each of the at least one identified Wi-Fi Access Point. Thereafter, method comprises initiating, via the Wi-Fi Connection Manager Client, a temporary connection between the UE via each of the at least one identified Wi-Fi Access Point and an internal network node of a parent service provider network. The method further comprises initiating, via the Wi-Fi Connection Manager Client, a learning process to collect one or more information relating to one or more successful connections between the UE and each of the at least one identified Wi-Fi Access Point, in an event of a successful connection between the UE via each of the at least one identified Wi-Fi Access Point and the internal network node of the parent service provider network. Further, the method comprises categorizing, via the Wi-Fi Connection Manager Client, each of the at least one identified Wi-Fi Access Point (AP) into one of an offload access point (AP) set and a non-offload access point (AP) set, based on the collected one or more information, to offload the cellular data/voice from the cellular network to the Wi-Fi Access Point from the offload AP set or for Cellular and WLAN traffic aggregation.

Another aspect of the present invention relates to a system for identifying a Wi-Fi Access Point for cellular data/voice offload or cellular and WLAN traffic aggregation. The system comprises a processing unit, configured to initiate, at a user equipment (UE) a Wi-Fi Connection Manager Client to offload the cellular data/voice from the cellular network to the Wi-Fi Access Point or Cellular and WLAN traffic aggregation. The system further comprises the Wi-Fi Connection Manager Client configured to identify, at least one Wi-Fi Access Point, wherein each of the at least one Wi-Fi Access Point is associated with a user-defined Wi-Fi SSID. The Wi-Fi Connection Manager Client is thereafter configured to establish, a temporary connection between the UE and each of the at least one identified Wi-Fi Access Point. Further, the Wi-Fi Connection Manager Client is configured to initiate, a temporary connection between the UE via each of the at least one identified Wi-Fi Access Point and an internal network node of a parent service provider network. Thereafter, the Wi-Fi Connection Manager Client is configured to initiate, a learning process to collect one or more information relating to one or more successful connections between the UE and each of the at least one identified Wi-Fi Access Point, in an event of a successful connection between the UE via each of the at least one identified Wi-Fi Access Point and the internal network node of the parent service provider network. Further, the Wi-Fi Connection Manager Client is configured to categorize, each of the at least one identified Wi-Fi Access Point (AP) into one of an offload access point (AP) set and a non-offload access point (AP) set, based on the collected one or more information, to offload the cellular data/voice from the cellular network to the Wi-Fi Access Point from the offload AP set or Cellular and WLAN traffic aggregation.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

Figure 1:
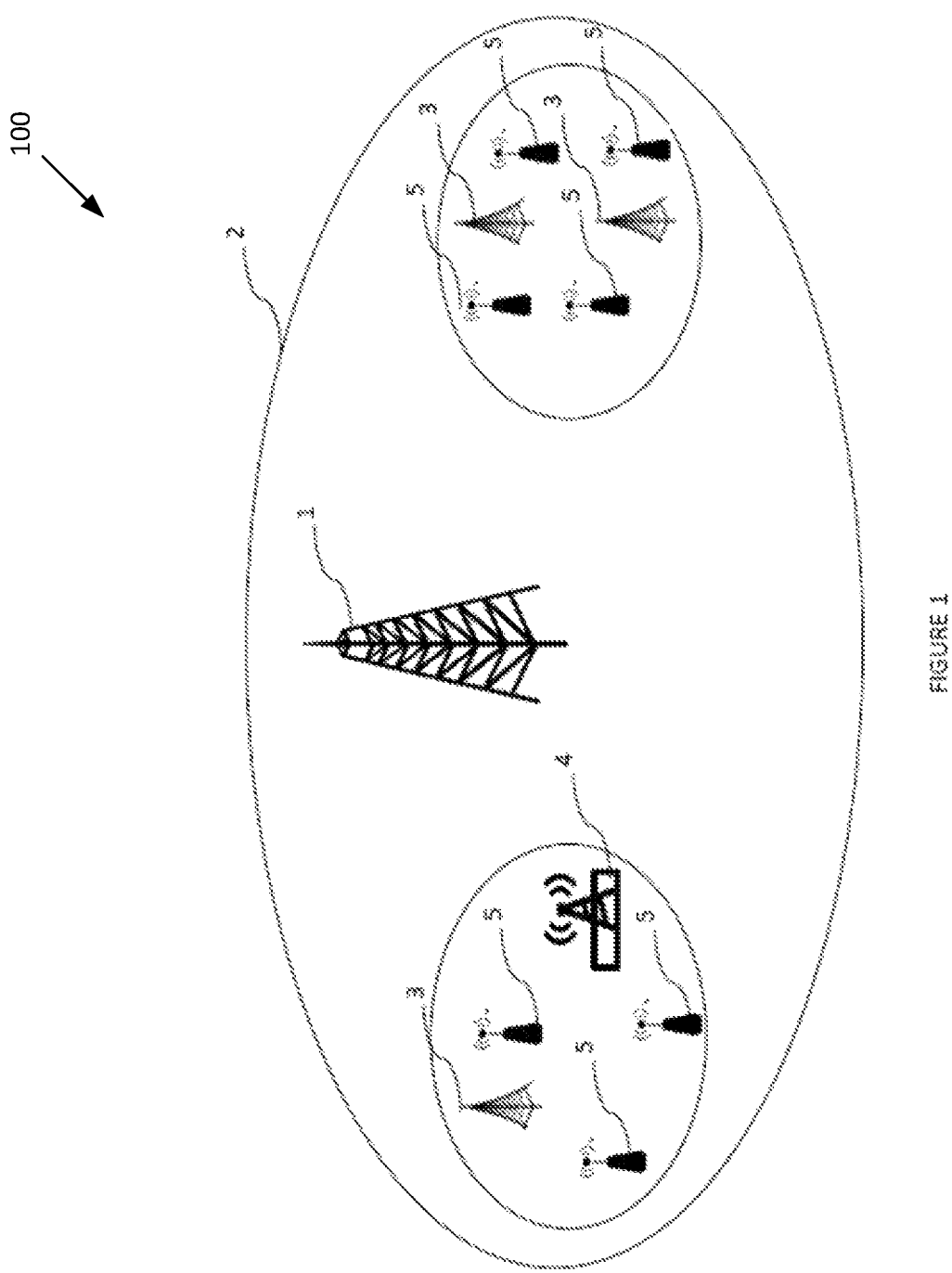
FIG. 1 illustrates an exemplary heterogeneous network [100], in accordance with exemplary embodiments of the present invention.

The foregoing shall be more apparent from the following more detailed description of the disclosure.

DESCRIPTION OF THE INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a sequence diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As utilized herein, terms "component," "system," "platform," "node," "layer," "selector," "interface," and the like are intended to refer to a computer-related entity, hardware, software (e.g., in execution), and/or firmware. For example, a component can be a process running on a processor, a processor, an object, an executable, a program, a storage device, and/or a computer. By way of illustration, an application running on a server and the server can be a component. One or more components can reside within a process and a component can be localized on one computer and/or distributed between two or more computers.

Further, these components can execute from various computer-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software application or a firmware application executed by a processor, wherein the processor can be internal or external to the apparatus and executes at least a part of the software or firmware application. As yet another example, a component can be any apparatus that provides specific functionality through electronic components without mechanical parts, the electronic components can include a processor therein to execute software or firmware that confers at least in part the functionality of the electronic components.

In addition, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ (BD); smart card(s), flash memory device(s) (e.g., card, stick, key drive).

Moreover, terms like "user equipment (UE)", "mobile station", "phone", "mobile phone", "smart computing device", "user device", "user equipment", "mobile subscriber station," "access terminal," "terminal," "handset," and similar terminology refers to any electrical, electronic, electro-mechanical or an equipment or a combination of one or more of the above devices. Smart computing devices may include, but not limited to, a mobile phone, smartphone, virtual reality (VR) devices, augmented reality (AR) devices, pager, laptop, a general-purpose computer, desktop, personal digital assistant, tablet computer, mainframe computer, or any other computing device as may be obvious to a person skilled in the art. In general, a smart computing device is a digital, user-configured, computer networked device that can be operated autonomously. A smart computing device is one of the appropriate systems for storing data and other private/sensitive information. The smart computing device operates at all the seven levels of ISO reference model, but the primary function is related to the application layer along with the network, session and presentation layer. The smart computing device may also have additional features of a touch screen, apps ecosystem, physical and biometric security, etc. Further, the foregoing terms are utilized interchangeably in the subject specification and related drawings.

Furthermore, the terms "user," "subscriber," "customer," "consumer," "agent,", "owner," and the like are employed interchangeably throughout the subject specification and related drawings, unless context warrants particular distinction(s) among the terms. It should be appreciated that such terms can refer to human entities, or automated components supported through artificial intelligence, e.g., a capacity to make inference based on complex mathematical formulations, that can provide simulated vision, sound recognition, decision making, etc. In addition, the terms "wireless network" and "network" are used interchangeable in the subject application, unless context warrants particular distinction(s) among the terms.

As used herein, "cellular data" or "cellular data/voice" comprises at least one of a cellular data and a cellular voice data.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

Hereinafter, exemplary embodiments of the present disclosure will be described in detail with reference to the accompanying drawings so that those skilled in the art can easily carry out the present disclosure.

The present invention provides a solution for identifying a Wi-Fi Access Point for cellular data/voice offload or cellular and WLAN traffic aggregation. The present invention in order to identify the Wi-Fi Access Point for offloading, provides an enhancement in Access Network Detection and Selection Function (ANDSF), based on discovering and learning of one or more Wi-Fi Access Points having user's preferred Wi-Fi network access names (SSIDs), and are reachable from a parent operator network. Furthermore, the Wi-Fi Access Point identified via the present invention is at least one of an Enterprise Wi-Fi Access Point and a non-Enterprise Wi-Fi Access Point. Further, the present disclosure also discloses a Wi-Fi Connection Manager Client associated with an ANDSF server and encompasses the use of an ANDSF management object (MO) for distinguishing and prioritization amongst Wi-Fi SSIDs based on IP Pool information received in the MO. Also, the present invention comprises dynamic learning at the Wi-Fi Connection Manager client level itself, for instance, the present invention encompasses identifying if a user-selected SSID/non-Enterprise and/or an Enterprise Wi-Fi Access Point is parent operator reachable or not, and in an event if the Wi-Fi Access Point is not parent operator reachable, Wi-Fi Connection Manager client categorizes said custom SSID in non-offload AP set for a pre-defined barring time-period. Also, the present invention encompasses identifying one or more Wi-Fi access names (SSIDs), by discovering and learning Wi-Fi access network(s) in a customer's premises where the customer may have defined a customized SSID on the Wi-Fi AP provided by the service provider, to increase the likelihood for automatic Wi-Fi offload on service provider network, thereby preventing revenue loss for the service provider by keeping the customer on its Network and also to enhance a customer experience in a heterogeneous network.

Further, the present invention also simplifies the problem relating to managing multiple managed SSIDs through a centralized server. For instance, each customer can define a unique custom SSID on the Wi-Fi Access Point in their premises even though the connectivity and the Access Point may be provided by the parent Service Provider. Therefore, the total number of custom SSIDs can be as high as the customer base of a Service Provider. If customers define multiple unique custom SSIDs on their Wi-Fi Access Points, the total number of SSIDs could be even higher. Therefore, a single managed SSID cannot be used in the case of Wi-Fi Access Network and it may be difficult to manage millions of managed SSID through a centralized server. The present invention simplifies this problem by enabling each Wi-Fi connection manager client to locally discover and manage the Wi-Fi SSIDs within the parent Service Provider Network.

The present invention is further explained in detail below with reference now to the diagrams.

Figure 2:
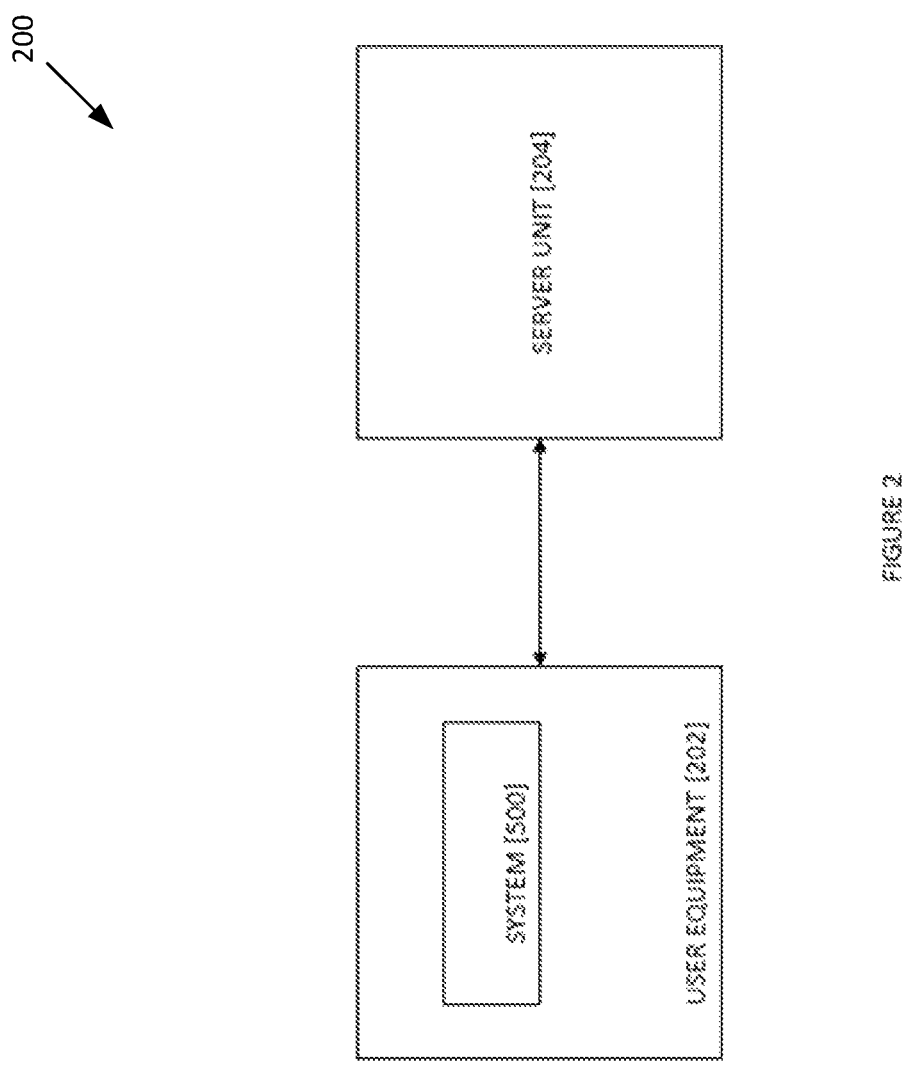
FIG. 2 illustrates an exemplary block diagram indicating a user equipment (UE) comprising a system, connected to a server entity, in accordance with exemplary embodiments of the present invention.

Referring to FIG. 2, an exemplary block diagram [200] indicating a user equipment (UE) [202] comprising a system [500], connected to a server unit [204], in accordance with exemplary embodiments of the present invention is shown.

The block diagram [200] as provided in FIG. 2 indicates, that the user equipment (UE) [202] is connected to the server unit [204], to implement various functions of the present invention. Further, the UE [202] comprises at least one system [500] to identify a Wi-Fi Access Point for offloading a cellular data from a cellular network, wherein the Wi-Fi Access Point is at least one an Enterprise Wi-Fi Access Point and a non-Enterprise Wi-Fi Access Point. Furthermore, in an implementation the at least one system [500] is also configured to identify the Wi-Fi Access Point for cellular and WLAN traffic aggregation. Also, in FIG. 2 only a few units are shown, however, there may be multiple such units or there may be any such numbers of said units, obvious to a person skilled in the art or as required to implement the features of the present disclosure.

Further, the user equipment (UE) [202] refers to a mobility wireless cellular connectivity device having a Wi-Fi capability on both 2.4 GHz and 5 GHz unlicensed bands in addition to a cellular capability. The UE [202] may have an advanced mobile operating system which further combines features of a personal computer operating system with other features useful for mobile or handheld use. The user equipment/smartphones [202] can access the Internet, and usually have a touchscreen user interface, also the user equipment [202] can run third-party applications including the capability of hosting online applications, music players etc. Furthermore, these smartphone devices [202] may also be camera smartphone devices, capable of possessing high-speed mobile broadband 4G/5G internet with video calling functionality, hotspot functionality, motion sensors, mobile-payment mechanisms, enhanced security features with alarm and alert in emergencies and other similar functionalities. Also, mobility devices may include smartphones, wearable devices, smart-watches, smart bands, wearable augmented devices, etc.

Also, the UE [202] comprises the system [500], configured to identify, the Wi-Fi Access Point for offloading the cellular data of the UE [202] from the cellular network to the Wi-Fi Access Point. Furthermore, in an implementation the UE [202] comprising the system [500] is also configured to identify the Wi-Fi Access Point for cellular and WLAN traffic aggregation. Also, the system [500] further comprises at least a Wi-Fi Connection Manager Client to implement various features of the present invention.

Figure 3:
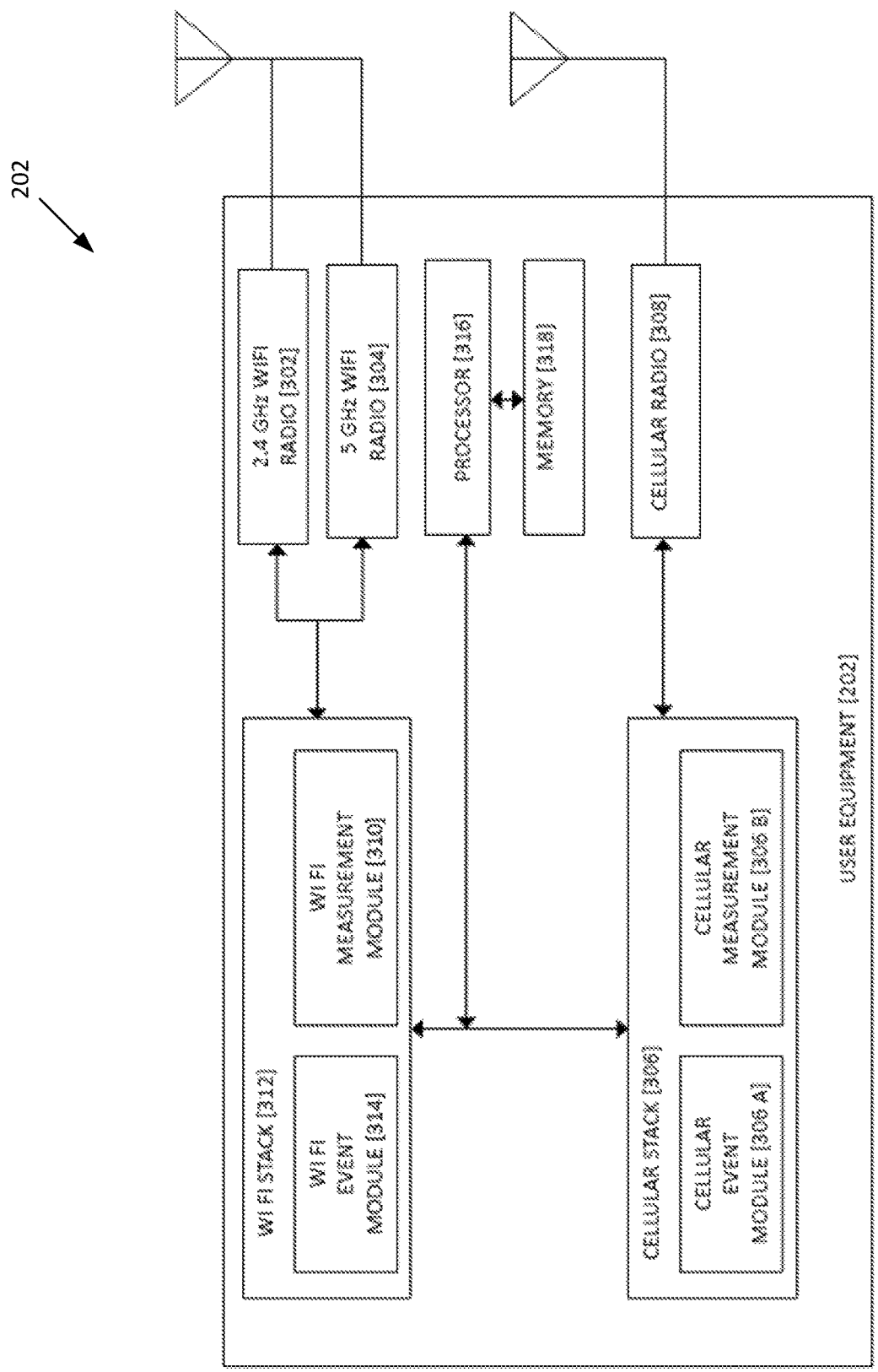
FIG. 3 illustrates an exemplary block diagram of the user equipment (UE), in accordance with exemplary embodiments of the present invention.

Furthermore, an exemplary block diagram of UE [202] is shown in FIG. 3, in accordance with exemplary embodiments of the present invention. Further, in FIG. 3, the UE [202] is depicted to have a Wi-Fi capability on both 2.4 GHz and 5 GHz unlicensed bands (via onboard 2.4 GHz [302] and 5 GHz [304] Wi-Fi radios and corresponding chipsets respectively) in addition to a cellular capability consisting of a cellular stack [306] and a cellular radio [308]. The cellular stack [306] further comprises a cellular event module [306 A] and a cellular measurement module [306 B]. Further, the UE [202] comprises a 'Wi-Fi measurement' module [310] as a part of a Wi-Fi stack [312], to carry out one or more wireless local area network (WLAN) measurements on the 2.4 GHz and the 5 GHz radios. Also, the UE [202] comprises a Wi-Fi Event module [314] as a part of the Wi-Fi stack [312], configured to trigger one or more Wi-Fi attach/detach events based on one or more measurements reports from the 'Wi-Fi measurement' module [310]. Further, the attach events and the detach events are triggered automatically from a system [500] (not shown in the FIG. 3 for the purpose of clarity). Further, Cellular stack [306] may have the capability to communicate with the Wi-Fi measurement module [310] and the Wi-Fi Event module [314]. Further, the UE [202] also comprises a processor [316], and a memory [308] for driving one or more modules of the user equipment [202] to perform their respective function. Also, in FIG. 3 only a few units are shown, however, the UE [202] may comprise multiple such units or the UE [202] may comprise any such numbers of said units, obvious to a person skilled in the art or as required to implement the features of the present disclosure.

Further, the server unit [204] may be an ANDSF server installed at a service provider's network entity. Also, in an instance, the server unit [204] may further comprise an ANDSF Quality Server, an ANDSF Policy server and a notification server such as GCM/FCM/APNS Push Notification Server. Also, the system [500] receives at the UE [202], from the server unit [204], one or more ANDSF server defined priorities assigned to one or more Wi-Fi Access Point(s), to manage parent service provider's Wi-Fi Access Point(s) for offloading.

Figure 4:
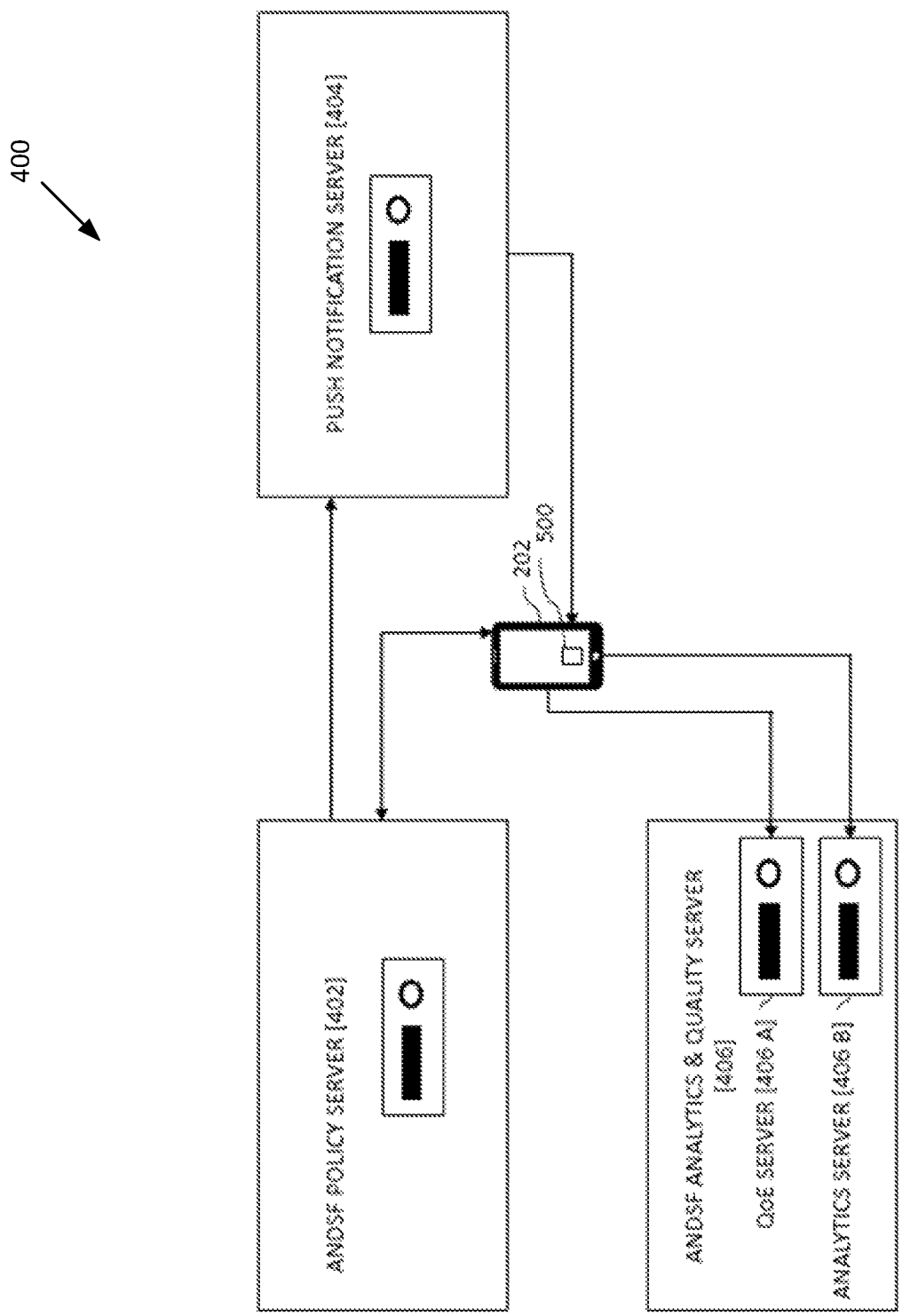
FIG. 4 illustrates an exemplary block diagram illustrating an implementation of an interconnection between the user equipment (UE) comprising the system, an ANDSF policy server, a push notification server and an ANDSF analytics and quality server, in accordance with exemplary embodiments of the present invention.

Furthermore, FIG. 4 illustrates an exemplary block diagram illustrating an exemplary implementation of an interconnection between the user equipment (UE) [202] comprising the system [500], an ANDSF policy server [402], a push notification server [404] and an ANDSF analytics and quality server [406], in accordance with exemplary embodiments of the present invention.

Further, the ANDSF policy server [402], the push notification server [404] and the ANDSF analytics and quality server [406] may be a part of the sever unit [204] implemented at the parent service provider's network entity. The ANDSF analytics and quality server [406] further comprises a QoE server [406 A] and an analytics server [406 B]. Also, as indicated in the FIG. 4, the UE [202] comprising the system [500] is connected to the ANDSF policy server [402], the push notification server [404] and the ANDSF analytics and quality server [406].

Further, in an instance when the Wi-Fi Connection Manager Client of the system [500] is initiated at the UE [202], one or more unique credentials of the user equipment [202] for registration and authentication with the ANDSF policy server [402], are transmitted from the system [500] to the ANDSF policy server [402]. Further, if in an event the registration and authentication are successful, the system [500], fetches one or more public land mobile network (PLMN) details from the UE [102] and thereafter communicates these PLMN details to the ANDSF policy server [402], for fetching one or more policies. Thereafter, the system [500] receives from the server unit [204] (i.e. the ANDSF policy server [402]), the one or more policies comprising details such as priorities assigned to one or more Wi-Fi Access Point(s) Also, the authentication method used by the system [500] can either be EAP-AKA based in case of enterprise Wi-Fi or WPA2 based in case of service provider's Wi-Fi access networks in customer's premises where customer may have defined a customized SSID on the Wi-Fi AP provided by the service provider.

Further, in addition to Wi-Fi signal thresholds, the system [500] also monitors Quality of Experience (QoE) to take appropriate offload decisions. While on operator Wi-Fi, the system [500] is configured to measure backhaul quality with the QoE server [406 A], in operator network/parent service provider's network. Also, in an event, if the quality conditions become poor, the system [500] disconnects a Wi-Fi connection by turning off a Wi-Fi module at the UE [202], and thereafter the system [500] connects the UE [202] to an LTE/cellular network. Further, the system [500] also uploads certain analytics KPIs on the analytics server [406 B], in order to monitor a subscriber base. Furthermore, the push notification server [404], such as GCM/FCM/APNS server, is integrated with ANDSF policy server [402] and is configured to push one or more silent notifications to the system [500], to dynamically update policies for the system [500].

Figure 5:
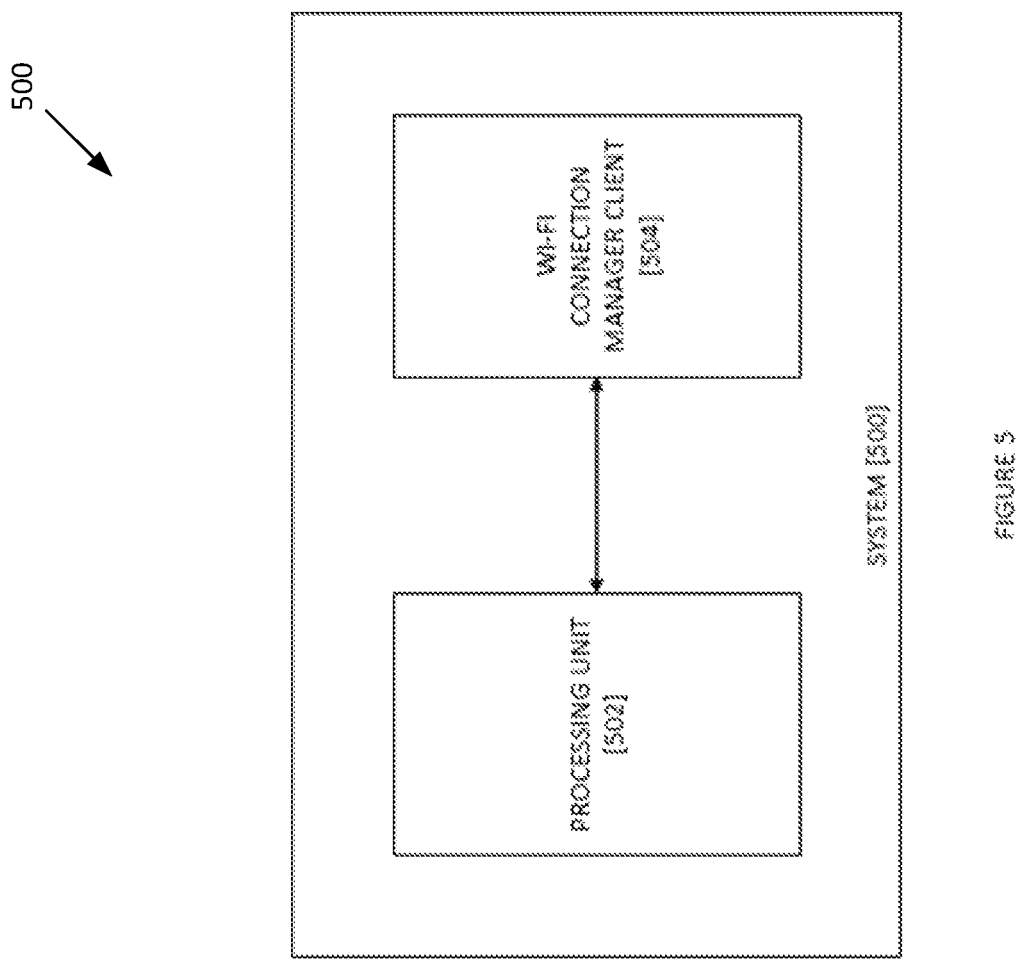
FIG. 5 illustrates an exemplary block diagram of the system [500], for identifying a Wi-Fi Access Point for offloading a cellular data/voice from a cellular network, in accordance with exemplary embodiments of the present invention.

Referring to FIG. 5, an exemplary block diagram of the system [500], for identifying a Wi-Fi Access Point for offloading a cellular data/voice from a cellular network, in accordance with exemplary embodiments of the present invention is shown.

The system [500] comprises, at least one processing unit [502] and at least one Wi-Fi Connection Manager Client [504]. In an instance, the system [500] resides in a user equipment [202] and is connected to a server unit [204] residing at a parent service provider's network entity. Further, the server unit [204] may be an ANDSF server. Also, all of the components/units of the system [500] are assumed to be connected to each other unless otherwise indicated below. Also, in FIG. 5 only a few units are shown, however, the system [500] may comprise multiple such units or the system [500] may comprise any such numbers of said units, obvious to a person skilled in the art or as required to implement the features of the present disclosure.

The system [500], is configured to identify a Wi-Fi Access Point for offloading a cellular data/voice from a cellular network, with the help of the interconnection between the components/units of the system [200].

The at least one processing unit [502] is connected to the at least one Wi-Fi Connection Manager Client [504]. The processing unit [502], configured to initiate, at a user equipment (UE) [202], a Wi-Fi Connection Manager Client [504] to offload the cellular data/voice from the cellular network to the Wi-Fi Access Point.

Further, the Wi-Fi Connection Manager Client [504] of the system [500] is configured to identify, at least one Wi-Fi Access Point, wherein each of the at least one Wi-Fi Access Point is associated with a user-defined Wi-Fi SSID. Further, the at least one Wi-Fi Access Point is at least one of at least one Enterprise Wi-Fi Access Point and at least one non-Enterprise Wi-Fi Access Point. Also, the Wi-Fi Connection Manager Client [504] is further configured to identify, the at least one Wi-Fi Access Point (i.e. at least one of at least one Enterprise Wi-Fi Access Point and at least one) based on a first attach procedure. Further in an instance, in the first attach procedure, for a first attach with a non-Enterprise Wi-Fi access point, the user manually turns on a Wi-Fi on the UE [202] and selects a custom Wi-Fi SSID of the non-Enterprise Wi-Fi access point. The user thereafter, enters a password and connects successfully with said non-Enterprise Wi-Fi access point. Further, this Wi-Fi SSID name and password information are saved in a storage unit, at the UE [202]. For instance, a user may have one or more non-Enterprise Wi-Fi Access Points from a parent service provider, in user's premises. The user has further defined a custom SSID name on each of the one or more Wi-Fi Access Points. The Wi-Fi Connection Manager Client [504] in such instance, is configured to identify said one or more non-Enterprise Wi-Fi Access Points with the user-defined SSID names, based on the one or more saved details of the first attach procedure of each of the one or more Wi-Fi Access Points from the parent service provider having the user-defined SSID name, with the UE [202].

The Wi-Fi Connection Manager Client [504] is thereafter configured to determine whether the at least one identified Wi-Fi Access Point is within a parent service provider network or not. The Wi-Fi Connection Manager Client [504] is therefore further configured to establish, a temporary connection between the UE [202] and each of the at least one identified Wi-Fi Access Point. Thereafter, the Wi-Fi Connection Manager Client [504] is also configured to initiate, a temporary connection between the UE [202] via each of the at least one identified Wi-Fi Access Point and an internal network node of a parent service provider network. Furthermore, the internal network node being an internal node of the parent service provider network, is only reachable by the UE [202] within its parent service provider network and is not reachable by the UE [202] on any other service provider network. Therefore, in an event the internal network node of the parent service provider network, is reachable by the UE [202] via each of the at least one identified Wi-Fi Access Point, a successful connection is established between the UE [202] via each of the at least one identified Wi-Fi Access Point and the internal network node of the parent service provider network. Further, in the event of the successful connection between the UE via each of the at least one identified Wi-Fi Access Point and the internal network node of the parent service provider network, the each of the at least one identified Wi-Fi Access Point is determined to be within the parent service provider network. For instance, the Wi-Fi Connection Manager Client [504] in order to establish a temporary connection between a UE [202] and an identified Wi-Fi Access Point, activate a Wi-Fi module of the UE [202] for a short duration of time and enables said temporary connection for said short duration of time. Thereafter, the Wi-Fi Connection Manager Client [504] is configured to initiate, a temporary connection between the UE [202] and an internal network node of a parent service provider network, via the established temporary connection between the UE [202] and the identified Wi-Fi Access Point, to determine whether the identified Wi-Fi Access Point is within the parent service provider network or not.

Thereafter, in an event of an unsuccessful connection (i.e. when the internal network node of the parent service provider network, is not reachable by the UE [202] via each of the at least one identified Wi-Fi Access Point) between the UE [202] via each of the at least one identified Wi-Fi Access Point and the internal network node of the parent service provider network, the Wi-Fi Connection Manager Client [504] is configured to re-initiate the temporary connection between the UE [202] via each of the at least one identified Wi-Fi Access Point and the internal network node of the parent service provider network, for a pre-defined number of times. Also, the Wi-Fi Connection Manager Client [504] is further configured to categorize each of the at least one identified Wi-Fi Access Point (AP) into a non-offload access point (AP) set, for a pre-defined barring time-period, based on the unsuccessful connection between the UE [202] via each of the at least one identified Wi-Fi Access Point and the internal network node of the parent service provider network for the pre-defined number of times. Further, as the internal network node of the parent service provider network may not be temporarily reachable due to a local connectivity issue, therefore the Wi-Fi Connection Manager Client [504] is further configured to re-initiate the temporary connection between the UE via each of the at least one identified Wi-Fi Access Point and the internal network node of a parent service provider network after the pre-defined barring time-period is over.

Further, the Wi-Fi Connection Manager Client [504] is configured to initiate, a learning process to collect one or more information relating to one or more successful connections between the UE [202] and each of the at least one identified Wi-Fi Access Point, in an event of the successful connection between the UE [202] via each of the at least one identified Wi-Fi Access Point and the internal network node of the parent service provider network. For instance, if each of the at least one identified Wi-Fi Access Point is determined to be within the parent service provider network based on the successful connection between the UE [202] via each of the at least one identified Wi-Fi Access Point and the internal network node of the parent service provider network, the Wi-Fi Connection Manager Client [504] initiates, the learning process to collect the one or more information relating to the one or more successful connections between the UE [202] and each of the at least one identified Wi-Fi Access Point. Further, the one or more information comprises at least, one or more details of total number of successful connections between the UE [202] and each of the at least one identified Wi-Fi Access Point. Further, the successful connection between the UE [202] and each of the at least one identified Wi-Fi Access Point is further based on at least one of a user-initiated and the temporary established connection, between the UE [202] and each of the at least one identified Wi-Fi Access Point.

The Wi-Fi Connection Manager Client [504] is thereafter configured to categorize, each of the at least one identified Wi-Fi Access Point (AP) into one of an offload access point (AP) set and the non-offload access point (AP) set, based on the collected one or more information, to offload the cellular data/voice from the cellular network to the Wi-Fi Access Point from the offload AP set. Also, the non-offload access point (AP) set may further be defined as a candidate set comprising one or more identified Wi-Fi Access Points (APs) as possible candidate SSID(s) of the parent Service Provider's Wi-Fi SSID, for Wi-Fi offloading. For instance, the Wi-Fi Connection Manager Client [504] based on the details of total number of the successful connections as encompassed in the collected one or more information, categorizes, the each of the at least one identified Wi-Fi Access Point (AP) into the offload access point (AP) set, in an event the total number of the successful connections are more than or equal to a pre-defined number of times. Also, in an event if the total number of the successful connections is less than the pre-defined number of times, the Wi-Fi Connection Manager Client [504] is configured to categorize, the each of the at least one identified Wi-Fi Access Point (AP) into a candidate SSID of the parent Service Provider's Wi-Fi SSID, for Wi-Fi offloading, under the the non-offload access point (AP) set. In an event, if the total number of the successful connections is less than the pre-defined number of times, the Wi-Fi Connection Manager Client [504], is configured to retain the each of the at least one identified Wi-Fi Access Point (AP) in the non-offload access point (AP) set (i.e. in a candidate set) for a pre-defined time interval. In an event when the pre-defined time interval is reached, the Wi-Fi Connection Manager Client [504] is configured to flush the candidate set list.

Further, the Wi-Fi Connection Manager Client [504], is configured to identify, an IP pool corresponding to each of the at least one identified Wi-Fi AP from the offload access point (AP) set, based on a connection initiated via the Wi-Fi Connection Manager Client [504], between the UE [202] via each of the at least one identified Wi-Fi Access Point and one or more internal network nodes of the parent service provider network. Also, the IP pool further comprises at least one list of one or more IP addresses. Further, in an example, two identified Wi-Fi APs such as a Mi-Fi routers based and a fiber-based identified Wi-Fi AP may be mapped to two different IP pools, the Wi-Fi Connection Manager Client [504] in such instance is configured to identify one or more IP addresses associated with the each of the Mi-Fi routers based and the fiber-based identified Wi-Fi AP, based on a connection between the UE [202] and the one or more internal network nodes of the parent service provider network, via each of the Mi-Fi routers based and the fiber-based identified Wi-Fi AP, to determine one or more IP pools corresponding to each of the Mi-Fi routers based and the fiber-based identified Wi-Fi AP.

Further, the Wi-Fi Connection Manager Client [504], is configured to transmit to the server unit [204], the identified IP pool, wherein the server unit [204] further assigns a priority to each of the at least one identified Wi-Fi Access Point (AP) from the offload access point (AP) set, based on the IP pool.

Thereafter, the Wi-Fi Connection Manager Client [504], is configured to receive from the server unit [204], the assigned priority of each of the at least one identified Wi-Fi Access Point (AP) from the offload access point (AP) set. For instance, the Wi-Fi Connection Manager Client [504] may receive from the server unit [204], one or more policies comprising at least the assigned priority of each of the at least one identified Wi-Fi Access Point (AP) from the offload access point (AP) set.

Further, in an instance the Wi-Fi Connection Manager Client [504] is also configured to receive from the server unit [204], an information relating to an Enterprise Wi-Fi AP. For instance, the Wi-Fi Connection Manager Client [504] receives from the server unit [204], one or more Enterprise Wi-Fi SSID lists i.e. managed SSID list through a standard ANDSF mechanism.

Also, the Wi-Fi Connection Manager Client [504] is further configured to identify, one or more Wi-Fi APs from the offload AP set, within the vicinity of the user equipment (UE) [202]. Also, all the Wi-Fi APs from the offload AP set are associated with the parent service provider network. Thereafter, the Wi-Fi Connection Manager Client [504] is configured to activate, a Wi-Fi module at the UE [202], based on the identification of the one or more Wi-Fi APs. For instance, when a user equipment [202] comes into the vicinity of a service provider's Wi-Fi SSID, the Wi-Fi Connection Manager Client [504] is configured to identify said service provider's Wi-Fi SSID and thereafter, the Wi-Fi Connection Manager Client [504] is configured to turn on a Wi-Fi module at the user equipment [202], based on said identification of the service provider's Wi-Fi SSID.

The Wi-Fi Connection Manager Client [504] is further configured to select, a Wi-Fi Access Point from the identified one or more Wi-Fi APs, based on the activation of the Wi-Fi module, the categorization of the each of the at least one identified Wi-Fi Access Point and at least one of the assigned priority and the information relating to the Enterprise Wi-Fi AP. For, instance, if a single Wi-Fi Access Point is identified within the vicinity of a UE [202], the Wi-Fi Connection Manager Client [504] in such event is configured to select the identified Wi-Fi Access Point as a Wi-Fi offloading access point based on the activation of the Wi-Fi module and the categorization of the identified Wi-Fi Access Point in an offload access point (AP) set. Further, in an instance, it is possible that the UE [202] may be in the vicinity of multiple Wi-Fi Access Points from the parent service provider—say an FTTx, Ethernet, Digital Subscriber Line (DSL), 2G/3G/4G/5G WAN based portable Routers (MiFi's or hotspots) etc. all of which have good signal strengths and are therefore candidates for Wi-Fi offload, the Wi-Fi Connection Manager Client [504] in such instance, is configured to select, a Wi-Fi Access Point from said identified multiple Wi-Fi Access Points based on the activation of the Wi-Fi module, the categorization of the each of the multiple Wi-Fi Access Points as an offload access point (AP) set and an assigned priority of each of the multiple Wi-Fi Access Points.

Thereafter, the Wi-Fi Connection Manager Client [504], is configured to offload, the cellular network to the selected Wi-Fi Access Point.

Figure 6:
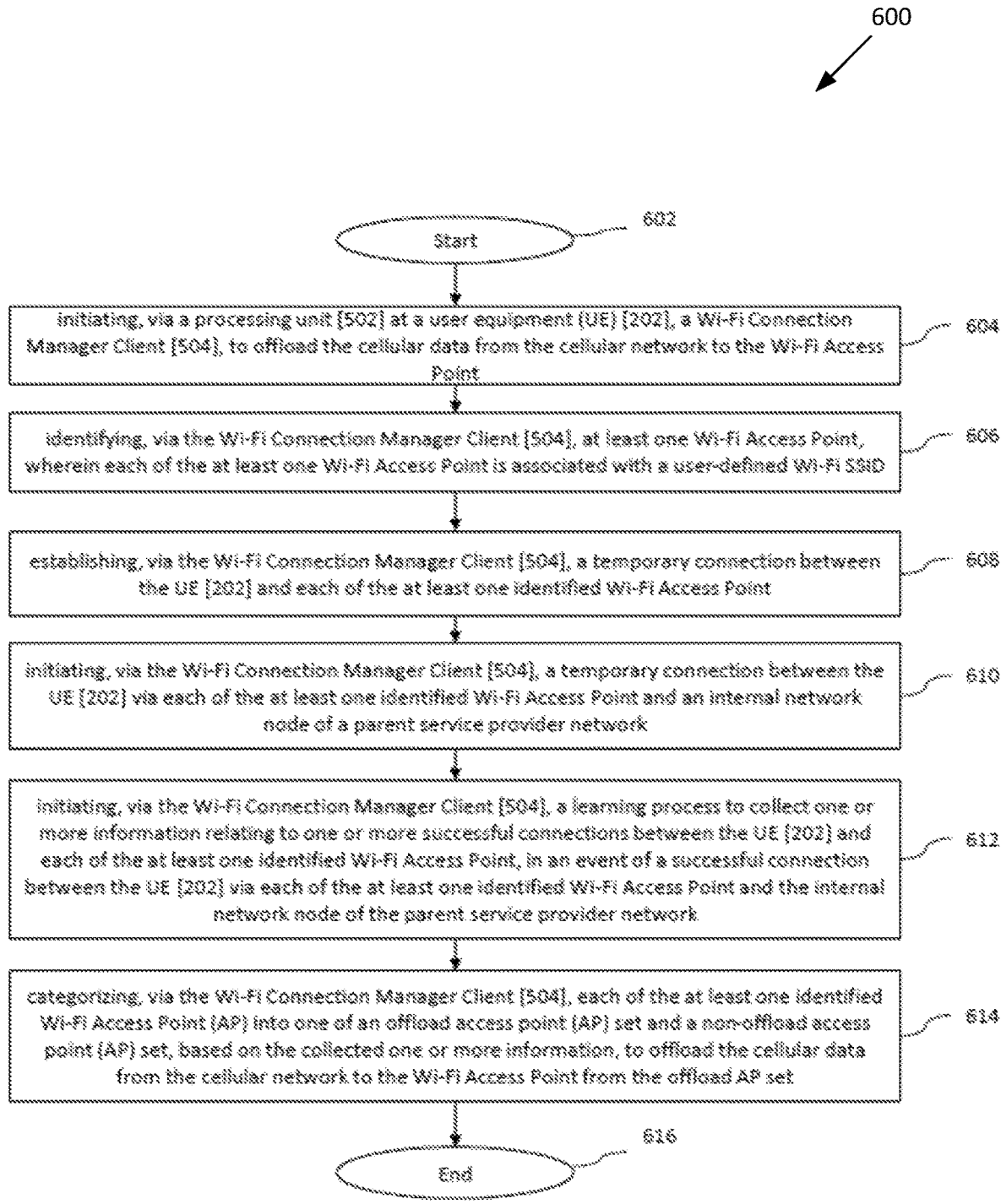
FIG. 6 illustrates an exemplary method flow diagram, depicting a method [600], for identifying a Wi-Fi Access Point for offloading a cellular data/voice from a cellular network, in accordance with exemplary embodiments of the present invention.

Referring to FIG. 6, an exemplary method flow diagram, depicting a method [600], for identifying a Wi-Fi Access Point for offloading a cellular data/voice from a cellular network, in accordance with exemplary embodiments of the present invention is shown. As shown in FIG. 6, the method begins at step [602]. Also, the method encompasses establishing a connection between a user equipment [202] and a server unit [204], to implement the features of the present invention. Further, the server unit [204] may be an ANDSF server.

At step [604], the method comprises initiating, via a processing unit [502] at the user equipment (UE) [202], a Wi-Fi Connection Manager Client [504], to offload the cellular data/voice from the cellular network to the Wi-Fi Access Point.

Next, at step [606], the method comprises identifying, via the Wi-Fi Connection Manager Client [504], at least one Wi-Fi Access Point, wherein each of the at least one Wi-Fi Access Point is associated with a user-defined Wi-Fi SSID. Further, the at least one Wi-Fi Access Point is at least one of at least one Enterprise Wi-Fi Access Point and at least one non-Enterprise Wi-Fi Access Point. Also, the identifying, via the Wi-Fi Connection Manager Client [504], the at least one Wi-Fi Access Point (i.e. at least one of at least one Enterprise Wi-Fi Access Point and at least one) is based on a first attach procedure. Further in an instance, in the first attach procedure, for a first attach with a non-Enterprise Wi-Fi access point, the user manually turns on a Wi-Fi module on the UE [202] and selects a custom Wi-Fi SSID of the non-Enterprise Wi-Fi access point. The user thereafter, enters a password and connects successfully with said non-Enterprise Wi-Fi access point. Further, this Wi-Fi SSID name and password information are saved in a storage unit, at the UE [202]. For instance, if a user has defined a custom SSID name for a non-Enterprise Wi-Fi Access Point from the parent service provider, the Wi-Fi Connection Manager Client [504] in such instance, is configured to identify said non-Enterprise Wi-Fi Access Point with the user-defined SSID name, based on the one or more saved details of the first attach procedure of said non-Enterprise Wi-Fi Access Point having the user-defined SSID name with the UE [202].

Next, the method comprises determining whether the at least one identified Wi-Fi Access Point is within a parent service provider network or not. Therefore, at step [608], the method comprises establishing, via the Wi-Fi Connection Manager Client [504], a temporary connection between the UE [202] and each of the at least one identified Wi-Fi Access Point. Also, the method further at step [610], comprises initiating, via the Wi-Fi Connection Manager Client [504], a temporary connection between the UE [202] via each of the at least one identified Wi-Fi Access Point and an internal network node of a parent service provider network. Furthermore, the internal network node being an internal node of the parent service provider network, is only reachable by the UE [202] within its parent service provider network and is not reachable by the UE [202] on any other service provider network. Therefore, in an event the internal network node of the parent service provider network, is reachable by the UE [202] via each of the at least one identified Wi-Fi Access Point, a successful connection is established between the UE [202] via each of the at least one identified Wi-Fi Access Point and the internal network node of the parent service provider network. Further, in the event of the successful connection between the UE [202] via each of the at least one identified Wi-Fi Access Point and the internal network node of the parent service provider network, the each of the at least one identified Wi-Fi Access Point is determined to be within the parent service provider network. For example, the method in order to establish a temporary connection between a UE [202] and an identified Wi-Fi Access Point, activate via the Wi-Fi Connection Manager Client [504], a Wi-Fi module of the UE [202] for a short duration of time and thereafter the method enables via the Wi-Fi Connection Manager Client [504], said temporary connection for said short duration of time. Thereafter, the method initiates, via the Wi-Fi Connection Manager Client [504], a temporary connection between the UE [202] and an internal network node of a parent service provider network, via the established temporary connection between the UE [202] and the identified Wi-Fi Access Point, to determine whether the identified Wi-Fi Access Point is within the parent service provider network or not.

Further, an event indicating that the internal network node of the parent service provider network, is not reachable by the UE [202] via each of the at least one identified Wi-Fi Access Point, an unsuccessful connection between the UE [202] via each of the at least one identified Wi-Fi Access Point and the internal network node of the parent service provider network, is detected in said event. Further, the method in said event of unsuccessful connection between the UE [202] via each of the at least one identified Wi-Fi Access Point and the internal network node of the parent service provider network, further encompasses re-initiating via the Wi-Fi Connection Manager Client [504], the temporary connection between the UE [202] via each of the at least one identified Wi-Fi Access Point and the internal network node of the parent service provider network, for a pre-defined number of times. Also, the method thereafter encompasses categorizing via the Wi-Fi Connection Manager Client [504], each of the at least one identified Wi-Fi Access Point (AP) into a non-offload access point (AP) set, for a pre-defined barring time-period, based on the unsuccessful connection between the UE [202] via each of the at least one identified Wi-Fi Access Point and the internal network node of the parent service provider network for the pre-defined number of times. Further, as the internal network node of the parent service provider network may not be temporarily reachable due to a local connectivity issue, therefore the method also encompasses re-initiating via the Wi-Fi Connection Manager Client [504], the temporary connection between the UE [202] via each of the at least one identified Wi-Fi Access Point and the internal network node of a parent service provider network after the pre-defined barring time-period is over.

Next, at step [612], the method comprises initiating, via the Wi-Fi Connection Manager Client [504], a learning process to collect one or more information relating to one or more successful connections between the UE [202] and each of the at least one identified Wi-Fi Access Point, in an event of the successful connection between the UE [202] via each of the at least one identified Wi-Fi Access Point and the internal network node of the parent service provider network. Further, the one or more information comprises at least, one or more details of the total number of successful connections between the UE [202] and each of the at least one identified Wi-Fi Access Point. Further, the successful connection between the UE [202] and each of the at least one identified Wi-Fi Access Point is further based on at least one of a user-initiated and the temporary established connection, between the UE [202] and each of the at least one identified Wi-Fi Access Point.

Next, at step [614], the method comprises categorizing, via the Wi-Fi Connection Manager Client [504], each of the at least one identified Wi-Fi Access Point (AP) into one of an offload access point (AP) set and a non-offload access point (AP) set, based on the collected one or more information, to offload the cellular data/voice from the cellular network to the Wi-Fi Access Point from the offload AP set. Also, the non-offload access point (AP) set may further be defined as a candidate set comprising one or more identified Wi-Fi Access Points (APs) as possible candidate SSID(s) of the parent Service Provider's Wi-Fi SSID, for Wi-Fi offloading. For instance, the method based on the details of the total number of the successful connections as encompassed in the collected one or more information, categorizes, via the Wi-Fi Connection Manager Client [504], the each of the at least one identified Wi-Fi Access Point (AP) into the offload access point (AP) set, in an event the total number of the successful connections are more than or equal to a pre-defined number of times. Also, in an event if the total number of the successful connections are less than the pre-defined number of times, method categorizes via the Wi-Fi Connection Manager Client [504], the each of the at least one identified Wi-Fi Access Point (AP) into a candidate SSID of the parent Service Provider's Wi-Fi SSID for Wi-Fi offloading, under the the non-offload access point (AP) set. In an event if the total number of the successful connections are less than the pre-defined number of times, the Wi-Fi Connection Manager Client [504], retains the each of the at least one identified Wi-Fi Access Point (AP) in the non-offload access point (AP) (i.e. in a candidate set) for a pre-defined time interval. In an event when the pre-defined time interval is reached, the Wi-Fi Connection Manager Client [504] flushes the candidate set list.

Thereafter, the method encompasses identifying, via the Wi-Fi Connection Manager Client [504], an IP pool corresponding to each of the at least one identified Wi-Fi AP from the offload access point (AP) set, based on initiating, via the Wi-Fi Connection Manager Client a connection between the UE [202] via each of the at least one identified Wi-Fi Access Point and one or more internal network nodes of the parent service provider network. Also, the IP pool further comprises at least one list of one or more IP addresses. Further, in an example, two identified Wi-Fi APs such as a Mi-Fi router based and a fiber-based identified Wi-Fi AP may be mapped to two different IP pools, the method in such instance encompasses identifying via the Wi-Fi Connection Manager Client [504], one or more IP addresses associated with the each of the Mi-Fi routers based and the fiber-based identified Wi-Fi AP, based on a connection between the UE [202] and the one or more internal network nodes of the parent service provider network, via each of the Mi-Fi routers based and the fiber-based identified Wi-Fi AP, to determine one or more IP pools corresponding to each of the Mi-Fi routers based and the fiber-based identified Wi-Fi AP.

The method further encompasses transmitting, via the Wi-Fi Connection Manager Client [504] to a server unit [204], the identified IP pool, wherein the server unit [204] further assigns a priority to each of the at least one identified Wi-Fi Access Point (AP) from the offload access point (AP) set, based on the IP pool.

Further, the method encompasses receiving at the Wi-Fi Connection Manager Client [504] from the server unit [204], the assigned priority of each of the at least one identified Wi-Fi Access Point (AP) from the offload access point (AP) set. For instance, the method may comprise receiving at the Wi-Fi Connection Manager Client [504] from the server unit [204], one or more policies comprising at least the assigned priority of each of the at least one identified Wi-Fi Access Point (AP) from the offload access point (AP) set.

Further, in an instance, the method also receives at the Wi-Fi Connection Manager Client [504] from the server unit [204], an information relating to an Enterprise Wi-Fi AP. For instance, the method comprises receiving at the Wi-Fi Connection Manager Client [504] from the server unit [204], one or more Enterprise Wi-Fi SSID lists i.e. managed SSID list through a standard ANDSF mechanism.

The method further comprises identifying, via the Wi-Fi Connection Manager Client [504], one or more Wi-Fi APs from the offload AP set, within the vicinity of the user equipment (UE) [202]. Also, all the Wi-Fi APs from the offload AP set are associated with the parent service provider network. Further, the method comprises activating, via the Wi-Fi Connection Manager Client [504], a Wi-Fi module at the UE [202], based on the identification of the one or more Wi-Fi APs. For instance, when a user equipment [202] comes into the vicinity of a service provider's Wi-Fi SSID (i.e. a Wi-Fi APs from the offload AP set), the method via the Wi-Fi Connection Manager Client [504], identifies, said service provider's Wi-Fi SSID and thereafter, the method encompasses activating via the Wi-Fi Connection Manager Client [504], a Wi-Fi module at the user equipment [202], based on said identification of the service provider's Wi-Fi SSID.

Thereafter, the method comprises selecting, via the Wi-Fi Connection Manager Client [504], a Wi-Fi Access Point from the identified one or more Wi-Fi APs based on the activation of the Wi-Fi module, the categorization of the each of the at least one identified Wi-Fi Access Point and at least one of the assigned priority and an information relating to an Enterprise Wi-Fi AP.

For, instance, if a single Wi-Fi Access Point is identified within the vicinity of a UE [202], the method in such event comprises selecting via the Wi-Fi Connection Manager Client [504], the identified Wi-Fi Access Point as a Wi-Fi offloading access point based on the activation of the Wi-Fi module and the categorization of the identified Wi-Fi Access Point in an offload access point (AP) set. Further, in an instance, it is possible that the UE [202] may be in the vicinity of multiple Wi-Fi Access Points from the parent service provider—say an FTTx, Ethernet, Digital Subscriber Line (DSL), 2G/3G/4G/5G WAN based portable Routers (MiFi's or hotspots) etc. all of which have good signal strengths and are therefore candidates for Wi-Fi offload, the method in such instance, comprises selecting via the Wi-Fi Connection Manager Client [504], a Wi-Fi Access Point from said identified multiple Wi-Fi Access Points based on the activation of the Wi-Fi module, the categorization of the each of the multiple Wi-Fi Access Points as an offload access point (AP) set and an assigned priority of each of the multiple Wi-Fi Access Points.

The method further encompasses offloading, via the Wi-Fi Connection Manager Client [504], the cellular network to the selected Wi-Fi Access Point.

Thereafter, the method terminates at step [616].

Figure 7:
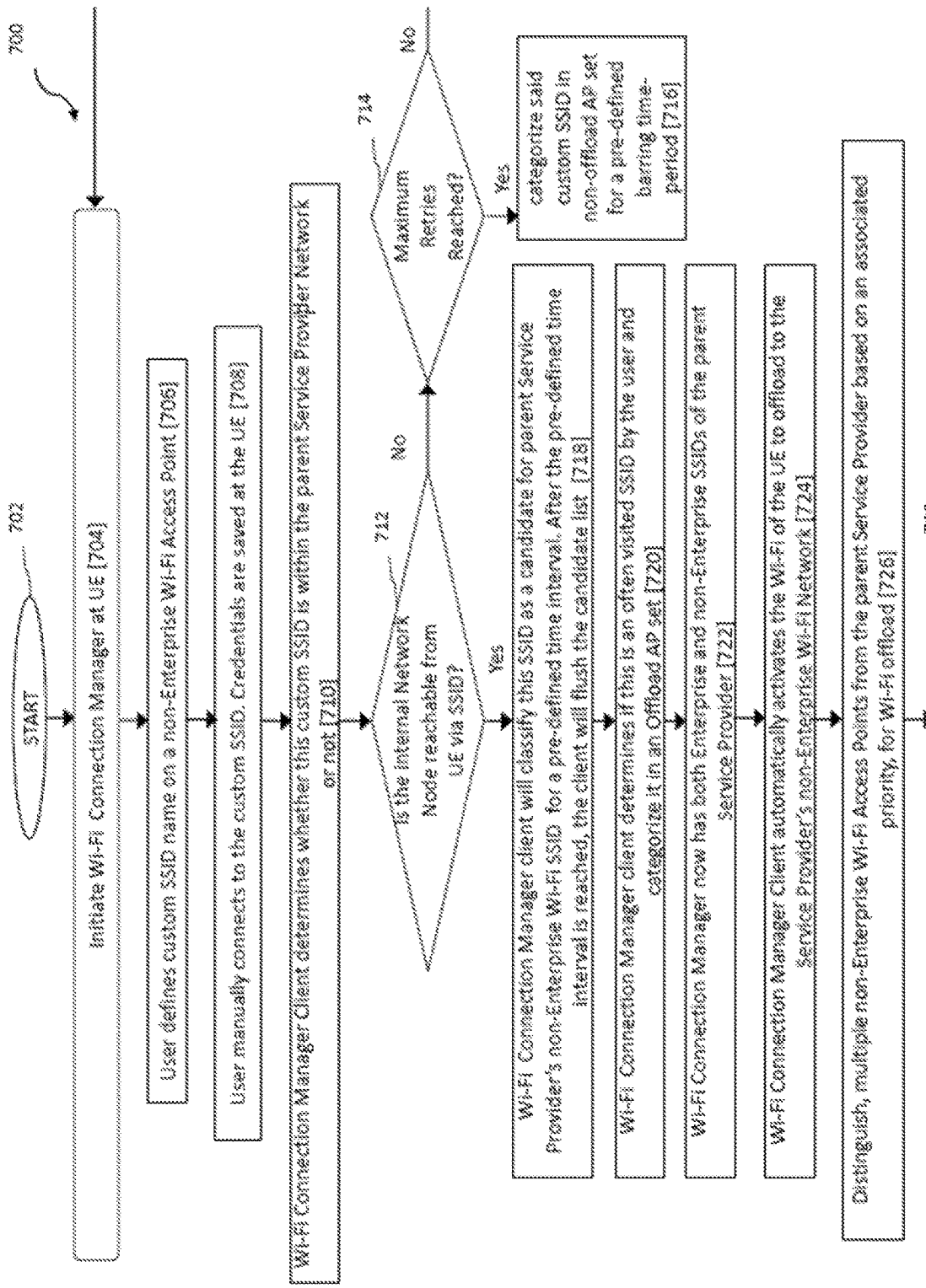
FIG. 7 illustrates an exemplary flow diagram, depicting an instance implementation of the process of identifying a non-Enterprise Wi-Fi Access Point for offloading a cellular data/voice from a cellular network, in accordance with exemplary embodiments of the present invention.

Referring to FIG. 7, an exemplary flow diagram, depicting an instance implementation of the process of identifying a non-Enterprise Wi-Fi Access Point for offloading a cellular data/voice from a cellular network, in accordance with exemplary embodiments of the present invention is shown. As shown in FIG. 7, the method begins at step [702].

At step [704], the method of the exemplary process encompasses initiating at a user equipment (UE) [202], a Wi-Fi Connection Manager Client [504].

Next, at step [706] the method comprises defining via a user a custom SSID name to a non-Enterprise Wi-Fi Access Point. Further, at step [708] the method encompasses manually connecting via the user, the UE [202] with the non-Enterprise Wi-Fi Access Point having custom SSID. Also, at step [708], the method further encompasses storing one or more credentials relating to said manually established connection, at the UE [202].

Next, at step [710] the method comprises determining via the Wi-Fi Connection Manager Client [504], whether the non-Enterprise Wi-Fi Access Point having custom SSID is within a parent Service Provider Network or not, based on initiating, via the Wi-Fi Connection Manager Client [504], a temporary connection between the UE [202] via the non- Enterprise Wi-Fi Access Point and an internal network node of the parent service provider network.

Next, at step [712] the method encompasses determining if the internal network node of the parent service provider network is reachable from the UE [202] via the non-Enterprise Wi-Fi Access Point. In an event the internal network node of the parent service provider network is reachable from the UE [202], the method leads to step [718], otherwise, the method leads to step [714].

Next, at step [714] the method comprises identifying whether the temporary connection between the UE [202] via the non-Enterprise Wi-Fi Access Point and an internal network node of the parent service provider network is re-initiated for a maximum number of retries. If the maximum retries reached the method leads to step [704], otherwise the method leads to step [716].

Next, at step [716] the method encompasses categorizing said non-Enterprise Wi-Fi Access Point having custom SSID, in non-offload AP set for a pre-defined barring time-period.

Next, at step [718] the method comprises classifying via the Wi-Fi Connection Manager Client [504], said non-Enterprise Wi-Fi Access Point as a candidate for parent service provider's non-Enterprise Wi-Fi SSID for a pre-defined time interval. After the pre-defined time interval is reached, the client will flush the candidate list.

Next, at step [720] the method encompasses determining via the Wi-Fi Connection Manager client [504], if said non-Enterprise Wi-Fi Access Point is an often visited SSID by the user to categorize it in an Offload AP set, based on collected one or more information via a learning process, relating to one or more successful connections between the UE [202] and the non-Enterprise Wi-Fi Access Point. Furthermore, the method categorizes the non-Enterprise Wi-Fi Access Point in the Offload AP set based on a total number of successful connections between the non-Enterprise Wi-Fi Access Point and the UE [202].

Next, at step [722] the method comprises receiving at the Wi-Fi Connection Manager client [504] from a server unit [204], an information relating to Enterprise Wi-Fi Access Point(s) of the parent service provider network, based on a standard ANDSF mechanism. Therefore, the Wi-Fi Connection Manager client [504] comprises both Enterprise and non-Enterprise SSIDs of the parent Service Provider based on the received information relating to Enterprise Wi-Fi Access Point(s) and the implementations of the features of the present invention, respectively.

Also, the method encompasses receiving at the Wi-Fi Connection Manager client [504] from the server unit [204], one or more policies comprising various details such as an associated priority details of the non-Enterprise Wi-Fi Access Point etc. Further, the server unit [204] assigns a priority to each of the one or more non-Enterprise Wi-Fi Access Point (AP) based on an IP pool. The IP pool is identified via the Wi-Fi Connection Manager Client [504] based on initiating a connection between the UE [202] via the non-Enterprise Wi-Fi Access Point and one or more internal network nodes of the parent service provider network. Further, this identified IP pool is transmitted via the Wi-Fi Connection Manager client [504] to the server unit [204].

Next, at step [724] the method encompasses automatically activating via the Wi-Fi Connection Manager Client [504], a Wi-Fi module at the UE [202], based on an identification of the one or more non-Enterprise Wi-Fi APs within the vicinity of the user equipment (UE) [202] to offload the cellular data/voice from the cellular network to the Service Provider's non-Enterprise Wi-Fi Network.

Next, at step [726] the method comprises distinguishing, multiple non-Enterprise Wi-Fi Access Points from the parent Service Provider, present within the vicinity of the user equipment (UE) [202], based on an associated priority with each of the multiple non-Enterprise Wi-Fi Access Points, for Wi-Fi offload.

Further, the method encompasses selecting via the Wi-Fi Connection Manager Client [504] a non-Enterprise Wi-Fi Access Points from the multiple non-Enterprise Wi-Fi Access Points based on said distinguishing of the multiple non-Enterprise Wi-Fi Access Points, the activation of the Wi-Fi module and the categorization of the non-Enterprise Wi-Fi Access Point into the offload AP set, to offload the cellular data/voice from the cellular network to the Service Provider's non-Enterprise Wi-Fi Network.

Thereafter, the method terminates at step [728].

As is evident from the above disclosure, the present disclosure provides a novel method and system to identify different user-defined access names for discovering and learning service provider's non-Enterprise Wi-Fi access networks for increasing the likelihood for automatic Wi-Fi offload on service provider network and enhancing customer experience to dynamically offload a user equipment. Furthermore, the present invention also enables each Wi-Fi connection manager client at the user equipment to locally manage the non-Enterprise Wi-Fi SSIDs within the parent Service Provider Network. The present disclosure thereby overcomes the limitations of the existing solutions.

Also, it is pertinent to note that while the novel technique described in this disclosure has been used to enhance the Wi-Fi offload solution as one of the applications, it is in no way limited to Wi-Fi offload only. Since the technique builds over and above the standard ANDSF functionality without using any of the underlying protocol of the ANDSF, it is independent of ANDSF and therefore can be applied equally well to general non-Enterprise Wi-Fi discovery and automated connection management solutions. It is also applicable to Cellular and WLAN link/traffic aggregation solutions that may require the discovery of non-Enterprise SSIDs belonging to a Service Provider's Wi-Fi Network for enabling link/traffic aggregation using technologies such as License Assisted Access (LAA), LTE-WLAN aggregation (LWA), LTE WLAN integration with IPSec tunnel (LWIP) and other such technologies.

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

We claim:

1. A method for identifying a Wi-Fi Access Point for offloading a cellular data from a cellular network, the method comprising:
   initiating, via a processing unit at a user equipment (UE), a Wi-Fi Connection Manager Client, to offload the cellular data from the cellular network to the Wi-Fi Access Point;
   identifying, via the Wi-Fi Connection Manager Client, at least one Wi-Fi Access Point, wherein each of the at least one Wi-Fi Access Point is associated with a user-defined Wi-Fi SSID;

establishing, via the Wi-Fi Connection Manager Client, a temporary connection between the UE and each of the at least one identified Wi-Fi Access Point;
initiating, via the Wi-Fi Connection Manager Client, a temporary connection between the UE via each of the at least one identified Wi-Fi Access Point and an internal network node of a parent service provider network;
initiating, via the Wi-Fi Connection Manager Client, a learning process to collect one or more information relating to one or more successful connections between the UE and each of the at least one identified Wi-Fi Access Point, in an event of a successful connection between the UE via each of the at least one identified Wi-Fi Access Point and the internal network node of the parent service provider network; and
categorizing, via the Wi-Fi Connection Manager Client, each of the at least one identified Wi-Fi Access Point (AP) into one of an offload access point (AP) set and a non-offload access point (AP) set, based on the collected one or more information, to offload the cellular data from the cellular network to the Wi-Fi Access Point from the offload AP set.

2. The method as claimed in claim 1, wherein the method further comprises:
identifying, via the Wi-Fi Connection Manager Client, an IP pool corresponding to each of the at least one identified Wi-Fi AP from the offload access point (AP) set, based on initiating, via the Wi-Fi Connection Manager Client a connection between the UE via each of the at least one identified Wi-Fi Access Point and one or more internal network nodes of the parent service provider network;
transmitting, via the Wi-Fi Connection Manager Client to a server unit, the identified IP pool, wherein the server unit further assigns a priority to each of the at least one identified Wi-Fi Access Point (AP) from the offload access point (AP) set, based on the IP pool; and
receiving at the Wi-Fi Connection Manager Client from the server unit, the assigned priority of each of the at least one identified Wi-Fi Access Point (AP) from the offload access point (AP) set.

3. The method as claimed in claim 2, wherein the method further comprises:
identifying, via the Wi-Fi Connection Manager Client, one or more Wi-Fi APs from the offload AP set, within the vicinity of the user equipment (UE);
activating, via the Wi-Fi Connection Manager Client, a Wi-Fi module at the UE, based on the identification of the one or more Wi-Fi APs;
selecting, via the Wi-Fi Connection Manager Client, a Wi-Fi Access Point from the identified one or more Wi-Fi APs based on the activation of the Wi-Fi module, the categorization of the each of the at least one identified Wi-Fi Access Point and at least one of the assigned priority and an information relating to an Enterprise Wi-Fi AP; and
offloading, via the Wi-Fi Connection Manager Client, the cellular network to the selected Wi-Fi Access Point.

4. The method as claimed in claim 1, wherein:
the at least one Wi-Fi Access Point is at least one of at least one Enterprise Wi-Fi Access Point and at least one non-Enterprise Wi-Fi Access Point; and
the identifying, via the Wi-Fi Connection Manager Client, the at least one Wi-Fi Access Point is based on a first attach procedure.

5. The method as claimed in claim 1, the method further comprises categorizing via the Wi-Fi Connection Manager client, each of the at least one identified Wi-Fi Access Point (AP) into the non-offload access point (AP) set, for a pre-defined barring time-period, based on an unsuccessful connection between the UE via each of the at least one identified Wi-Fi Access Point and the internal network node of the parent service provider network for a pre-defined number of times.

6. A system for identifying a Wi-Fi Access Point for offloading a cellular data from a cellular network, the system comprises:
a processing unit, configured to:
initiate, at a user equipment (UE) a Wi-Fi Connection Manager Client to offload the cellular data from the cellular network to the Wi-Fi Access Point;
the Wi-Fi Connection Manager Client configured to:
identify, at least one Wi-Fi Access Point, wherein each of the at least one Wi-Fi Access Point is associated with a user-defined Wi-Fi SSID,
establish, a temporary connection between the UE and each of the at least one identified Wi-Fi Access Point,
initiate, a temporary connection between the UE via each of the at least one identified Wi-Fi Access Point and an internal network node of a parent service provider network,
initiate, a learning process to collect one or more information relating to one or more successful connections between the UE and each of the at least one identified Wi-Fi Access Point, in an event of a successful connection between the UE via each of the at least one identified Wi-Fi Access Point and the internal network node of the parent service provider network, and
categorize, each of the at least one identified Wi-Fi Access Point (AP) into one of an offload access point (AP) set and a non-offload access point (AP) set, based on the collected one or more information, to offload the cellular data from the cellular network to the Wi-Fi Access Point from the offload AP set.

7. The system as claimed in claim 6, wherein the Wi-Fi Connection Manager Client is further configured to:
identify, an IP pool corresponding to each of the at least one identified Wi-Fi AP from the offload access point (AP) set, based on a connection initiated via the Wi-Fi Connection Manager Client, between the UE via each of the at least one identified Wi-Fi Access Point and one or more internal network nodes of the parent service provider network,
transmit to a server unit, the identified IP pool, wherein the server unit further assigns a priority to each of the at least one identified Wi-Fi Access Point (AP) from the offload access point (AP) set, based on the IP pool, and
receive from the server unit, the assigned priority of each of the at least one identified Wi-Fi Access Point (AP) from the offload access point (AP) set.

8. The system as claimed in claim 7, wherein the Wi-Fi Connection Manager Client is further configured to:
identify, one or more Wi-Fi APs from the offload AP set, within the vicinity of the user equipment (UE),
activate, a Wi-Fi module at the UE based on the identification of the one or more Wi-Fi APs,
select, a Wi-Fi Access Point from the identified one or more Wi-Fi APs based on the activation of the Wi-Fi module, the categorization of the each of the at least one identified Wi-Fi Access Point and at least one of the assigned priority and an information relating to an Enterprise Wi-Fi AP; and offload, the cellular network to the selected Wi-Fi Access Point.

9. The system as claimed in claim 6, wherein:

the at least one Wi-Fi Access Point is at least one of at least one Enterprise Wi-Fi Access Point and at least one non-Enterprise Wi-Fi Access Point; and the Wi-Fi Connection Manager Client is further configured to identify, the at least one Wi-Fi Access Point based on a first attach procedure.

10. The system as claimed in claim 6, wherein the Wi-Fi Connection Manager Client is further configured to categorize each of the at least one identified Wi-Fi Access Point (AP) into the non-offload access point (AP) set, for a pre-defined barring time-period, based on an unsuccessful connection between the UE via each of the at least one identified Wi-Fi Access Point and the internal network node of the parent service provider network for a pre-defined number of times.

11. One or more non-transitory computer-readable media comprising computer-exectuable instructions that, when executed by a computing system, perform a method for identifying a Wi-Fi Access Point for offloading a cellular data from a cellular network, the method comprising:

initiating, via a processing unit at a user equipment (UE), a Wi-Fi Connection Manager Client, to offload the cellular data from the cellular network to the Wi-Fi Access Point;

identifying at least one Wi-Fi Access Point, wherein each of the at least one Wi-Fi Access Point is associated with a user-defined Wi-Fi SSID;

establishing a temporary connection between the UE and each of the at least one identified Wi-Fi Access Point;

initiating a temporary connection between the UE via each of the at least one identified Wi-Fi Access Point and an internal network node of a parent service provider network;

initiating a learning process to collect one or more information relating to one or more successful connections between the UE and each of the at least one identified Wi-Fi Access Point, in an event of a successful connection between the UE via each of the at least one identified Wi-Fi Access Point and the internal network node of the parent service provider network; and categorizing each of the at least one identified Wi-Fi Access Point (AP) into an offload access point (AP) set or a non-offload access point (AP) set, based on the collected one or more information, to offload the cellular data from the cellular network to the Wi-Fi Access Point from the offload AP set.

* * * * *